United States Patent [19]

Fukuhira et al.

[11] Patent Number: 5,441,694
[45] Date of Patent: Aug. 15, 1995

[54] PREPARATION OF HIGH α-TYPE SILICON NITRIDE POWDER

[75] Inventors: Masanori Fukuhira, Takasaki; Hirofumi Fukuoka, Annaka; Yoshiharu Konya, Annaka; Masaki Watanabe, Annaka, all of Japan

[73] Assignee: Shin-Etsu Chemical Co., Ltd., Tokyo, Japan

[21] Appl. No.: 258,035

[22] Filed: Jun. 10, 1994

[30] Foreign Application Priority Data

Jun. 11, 1993 [JP] Japan ................................ 5-166183

[51] Int. Cl.$^6$ .............................................. B22F 1/00
[52] U.S. Cl. ........................................ 419/57; 264/63; 264/65; 264/66; 419/10; 419/13; 419/23; 419/33; 419/36; 419/45; 419/53; 419/60
[58] Field of Search .................. 419/10, 13, 23, 33, 419/36, 37, 45, 53, 57, 60; 264/63, 65, 66; 423/344; 501/88, 97

[56] References Cited

U.S. PATENT DOCUMENTS

| | | | |
|---|---|---|---|
| 3,206,318 | 9/1965 | Yamauchi et al. | 501/88 |
| 4,087,500 | 5/1978 | Fisher et al. | 264/42 |
| 4,716,133 | 12/1987 | Horiuchi et al. | 501/97 |
| 5,344,634 | 9/1994 | Edler | 423/344 |

FOREIGN PATENT DOCUMENTS 59-92906 of 1984 Japan.

OTHER PUBLICATIONS

Patent Abstracts of Japan, vol. 8, No. 205 (C–243)(1642) (Sep. 19, 1984).
Patent Abstracts of Japan, vol. 3, No. 142 (C–65) (Nov. 24, 1979).
Patent Abstracts of Japan, vol. 3, No. 83 (C–52) (Jul. 18, 1979).

*Primary Examiner*—Donald P. Walsh
*Assistant Examiner*—John N. Greaves
*Attorney, Agent, or Firm*—Millen, White, Zelano, & Branigan

[57] ABSTRACT

In a method for preparing a high α-type silicon nitride powder by adding to and mixing with metallic silicon powder a copper catalyst and nitriding the mixture in a non-oxidizing gas atmosphere containing nitrogen or ammonia at 1,000° to 1,500° C., the amount of copper catalyst is limited to from 0.05 % to less than 0.5 % by weight of copper based on the weight of the metallic silicon. There is obtained silicon nitride powder of high purity at low cost and high efficiency since the copper catalyst can be efficiently removed from the silicon nitride powder through conventional acid treatment.

19 Claims, No Drawings

PREPARATION OF HIGH α-TYPE SILICON NITRIDE POWDER

BACKGROUND OF THE INVENTION

1. Field of the Invention

This invention relates to a method for preparing high alpha-type silicon nitride powder.

2. Prior Art

There is expected an increasing demand for sintered silicon nitride as refractory structural material since it has improved high-temperature strength, thermal shock resistance and corrosion resistance. In particular, silicon nitride powder having an alpha-type crystalline phase content (to be referred to as α-conversion, hereinafter) of 90% by weight or higher is designated high alpha-type silicon nitride powder and known to exhibit extremely high material strength at elevated temperature when sintered. Prior art well-known industrial methods for the preparation of silicon nitride include (1) direct nitridation, (2) reducing nitridation, and (3) halogenated imidization. Most commonly used among others is the direct nitridation method which is cost effective.

As is well known in the art, the direct nitridation method involves exothermic reaction to generate heat as much as 176 kcal per mol as shown by the following chemical formula.

$$3Si + 2N_2 \rightarrow Si_3N_4 + 176 \text{ kcal}$$

It is therefore desired to restrain vigorous reaction to achieve a reaction temperature distribution as uniform as possible. For a tunnel furnace used as a reactor, it was proposed to adjust the charge to a tray or to control the heating rate. Also Japanese Patent Application Kokai (JP-A) Nos. 97110/1986, 266305/1986 and 60410/1991 disclose the use of a rotary kiln and fluidized bed as the reactor for providing a uniform reaction temperature.

From another point of view, the direct nitriding reaction is a gas-solid system reaction between gaseous nitrogen and solid metallic silicon. It is said that the reaction is apparently determined by diffusion of nitrogen gas into metallic silicon or into the resulting silicon nitride. It would occur to those skilled in the art to increase the reaction temperature or reaction pressure in order to increase the diffusion rate. In the silicon nitride-forming reaction, however, more β-type silicon nitride forms at higher temperature and the desired α-type silicon nitride is not obtained in a reasonable yield. As to the pressure, it is reported that pressure has little effect unless it is extremely high (see Surface, Vol. 24, No. 7, page 363, 1986). For commercial scale production, the use of a reactor capable of maintaining such an extremely high pressure is neither economical nor practical.

One well-known solution to this problem is by mixing the reaction gas with hydrogen gas.

Also proposed is a catalytic method which is relatively simple to produce high α-type silicon nitride powder. Exemplary catalysts heretofore known to be effective for this purpose include potassium, sodium and lithium compounds as disclosed in JP-A 128698/1975, magnesium oxide as disclosed in JP-A 48800/1976, metallic iron and iron compounds as disclosed in JP-A 15499/1979, alkaline earth metal halides as disclosed in JP-A 22000/1979, aluminum nitride as disclosed in JP-A 57499/1979, palladium oxide as disclosed in JP-A 58700/1979, calcium compounds as disclosed in JP-A 120298/1979, copper compounds as disclosed in JP-A 92906/1984, and vanadium compounds as disclosed in JP-A 256906/1986.

We found that among these catalysts, copper or copper compounds are by far most effective for producing high α-type silicon nitride powder. The method of the above-referred JP-A 92906/1984 requires that copper or copper compounds be added in amounts as large as 0.5 to 10% by weight based on the weight of metallic silicon, and it is rather difficult to purify the product or remove the copper catalyst. More particularly, conventional purification used in the art is typically acid treatment. When acid treatment was applied to a system loaded with a large amount of copper or copper compound, it was difficult to completely remove the copper or copper compound from the system. In this case, the resulting silicon nitride powder was molded and sintered into products which had strength below the desired level. Moreover, the addition of at most 10% by weight based on metallic silicon of a copper catalyst is undesirable from the point of view of economic production of silicon nitride.

SUMMARY OF THE INVENTION

An object of the present invention is to provide a method for preparing high α-type silicon nitride powder using a copper catalyst in an efficient, industrial, economical manner such that the copper catalyst may be conventionally removed to a sufficient extent to allow a sintered product of the resulting silicon nitride to retain strength.

Through experimentation, we have confirmed that copper or copper compounds have essential catalysis for promoting the efficient preparation of high α-type silicon nitride powder as disclosed in the above-referred JP-A 92906/1984, and found it effective to use as a starting material a mixture which is obtained by adding a copper catalyst to metallic silicon powder in a limited amount less than the amount specified in said publication and thoroughly mixing them in a mixer. By subjecting this mixture to nitridation in a non-oxidizing gas atmosphere containing nitrogen or ammonia at a temperature in the range of 1,000° to 1,500° C., high α-type silicon nitride powder can be produced in high yields, implying that the copper catalyst has exerted its full function.

More particularly, making investigations on the catalyst which is effective for promoting the preparation of high α-type silicon nitride powder, we have found that the use of copper as the catalyst leads to preparation of silicon nitride having a high α-conversion. While various catalysts were examined, copper has a remarkably increased coefficient of diffusion into metallic silicon as compared with other substances recognized for such catalysis such as iron and calcium. Probably this contributes to more reaction promotion than the other catalytic substances. See E. M. Pell, Phys. Rev., 119, 1014 and 1222 (1960). In addition, copper has a higher coefficient of heat transfer than the other catalytic substances, which provides favorable control of reaction heat and probably suppresses formation of β-type silicon nitride which is more stable at elevated temperature.

On the other hand, copper has a density of 8.93 g/cm$^3$ at 20° C. which is higher than metallic silicon's density of 2.35 g/cm$^3$ at 15° C. (amorphous). It is thus difficult to uniformly mix them. This is the reason why the prior art conventional method added an excess amount of a copper catalyst in order to provide sufficient catalysis. However, the copper added in excess is not necessarily dispersed uniformly, but tends to segregate in the nitride product. To ensure that the nitride product has acceptable purity, the commercial process of preparing silicon nitride by a direct nitriding method generally requires the step of removing impurities with the aid of acid. Although most impurities are removed to an acceptable level by the acid treatment, the excess copper catalyst cannot be removed to an acceptable level by such a conventional removal technique. Substantial retention of the copper catalyst in the final silicon nitride powder adversely affects the strength of a sintered product resulting therefrom.

Nevertheless, we have found that when copper or a copper compound is added to metallic silicon powder in an amount of less than 0.5%, preferably up to 0.4% by weight of copper based on the weight of the metallic silicon and the copper catalyst is uniformly dispersed in the metallic silicon powder so that the degree of mixing reaches 0.9 or more, there can be achieved a high α-conversion equivalent to that achieved with addition of 0.5% by weight or more of the copper catalyst. At the same time, the limited amount of the copper catalyst allows the resulting silicon nitride to be purified to high purity simply by conventional acid treatment. Therefore, this method ensures simple, efficient, cost effective preparation of high α-type silicon nitride powder which is ready for the production of a sintered product having high strength.

In order to take more advantage of the limited amount of the copper catalyst added, it is preferred to mold or granulate a powder mixture of metallic silicon powder and the copper catalyst into a shape or granules with the aid of a binder such as polyvinyl alcohol, methyl cellulose, cellulose derivatives, and starch, especially when nitridation is effected in a reactor subject to classification such as a fluidized bed and a rotary kiln. If desired, the shape or granules are sintered in an inert gas atmosphere (e.g., argon and helium) at atmospheric pressure or reduced pressure or in vacuum prior to nitridation. Alternatively, the powder mixture is melted to form a silicon-copper alloy which is finely divided to a suitable particle size prior to nitridation.

Therefore, the present invention in a first form provides a method for preparing a high alpha-type silicon nitride powder by adding to metallic silicon powder at least one member selected from copper and copper compounds in an amount of from 0.05% to less than 0.5% by weight of copper based on the weight of the metallic silicon and mixing the copper or copper compound with the metallic silicon so that the mixture has a degree of mixing of 0.9 or more.

In a second form, metallic silicon powder is added to and mixed with at least one member selected from copper and copper compounds in an amount of from 0.05% to less than 0.5% by weight of copper based on the weight of the metallic silicon. The mixture is molded into a shape with the aid of a binder. The shape is optionally sintered in an inert atmosphere at atmospheric pressure or reduced pressure or in vacuum.

In a third form, metallic silicon powder is blended and melted with at least one member selected from copper and copper compounds in an amount of from 0.05% to less than 0.5% by weight of copper based on the weight of the metallic silicon to form a silicon-copper alloy. The alloy is finely divided into grits having a predetermined particle size.

The silicon-copper mixture, irrespective of whether it is in mixture, molded shape, sintered shape or grit form, is then nitrided in a non-oxidizing gas atmosphere containing nitrogen or ammonia at a temperature in the range of 1,000° to 1,500° C.

DETAILED DESCRIPTION OF THE INVENTION

The method for preparing a high α-type silicon nitride powder according to the present invention relies on a direct nitridation method and carries out nitridation of metallic silicon powder in a non-oxidizing gas atmosphere containing nitrogen or ammonia at a temperature in the range of 1,000° to 1,500° C. while adding less than 0.5% by weight of copper or a copper compound to the silicon powder.

The metallic silicon powder as the raw material preferably has a particle size of several microns to about 149 $\mu$m, especially several microns to about 44 $\mu$m. Silicon powder with a particle size in excess of 149 $\mu$m has the likelihood of leaving unreacted metallic silicon in a nitrided product since the nitriding reaction would become slow. From the standpoint of purity, metallic silicon available on an industrial scale is satisfactory. If necessary, the metallic silicon may be selected from the range of the semiconductor grade to aluminum alloy use.

In the practice of the invention, a mixture of metallic silicon powder and copper or a copper compound is subject to direct nitridation. The copper or copper compound to be added to metallic silicon powder as a catalyst should preferably have such a particle size such that the copper particles are approximately equal in weight to metallic silicon particles when considered from the standpoint of uniformity. If copper is of thin film or flake form, however, it is unnecessary to place importance on the particle size and it is rather preferred that the copper or copper compound has a specific surface area of 0.1 to 5 m$^2$/g, especially 0.3 to 3 m$^2$/g.

The copper compounds which can be added to metallic silicon as the catalyst are not critical and include copper fluoride, copper oxide, copper chloride and other copper compounds. However, most copper compounds tend to decompose at low temperatures because of their low melting point, and the resulting by-products can erode the metallic silicon and remain in the silicon nitride product as impurities which would lower the strength of sintered silicon nitride. It is thus preferred to add metallic copper with a purity of 99% or higher. The form of copper is not critical and any of spherical, thin film, amorphous and commercially available forms is useful.

The amount of copper or copper compound added is from 0.05% to less than 0.5% by weight, especially from 0.1% to 0.4% by weight calculated as copper based on the weight of the metallic silicon. Less than 0.05% of copper is not effective to provide catalysis. Copper amounts of 0.5% by weight or more fail to attain the object of the invention because silicon nitride powder resulting from conventional purification steps can contain a substantial amount of residual copper or copper compound which will adversely affect the strength of a sintered product of the silicon nitride powder.

In the practice of the first aspect of the present invention, copper or a copper compound is mixed with metallic silicon powder so that a degree of mixing reaches 0.9 or more, preferably 0.93 or more, more preferably 0.95 or more. The degree of mixing of 0.9 or more can give an effect of the addition of copper or the copper compound to silicon powder when the concentration of copper is less than 0.5% by weight. If the degree of mixing is less than 0.9, the effect of the addition of copper or the copper compound cannot be attained when the concentration of copper is less than 0.5% by weight.

The degree of mixing is defined by the following Rose's equation. In the complete mixing state, the degree of mixing is 1 because $X_i = X_0$ in the following Rose's equation.

$$\text{Degree of mixing} = 1 - \frac{S}{\sigma_0}$$

wherein s is the standard deviation of copper concentration (% by weight on the weight of metallic silicon) in samples taken from a mixture of metallic silicon and copper or a copper compound, and $\sigma_0$ is the standard deviation of the completely separate state before mixing metallic silicon and copper or a copper compound. More detailedly, $$S^2 = \frac{1}{N} \sum_{i=1}^{N} (x_i - x_0)^2$$

$$x_0 = \frac{W_{cu}}{W_{si} + W_{cu}}$$

$$\delta_0 = \sqrt{x_0(1 - x_0)}$$

wherein N is the number of samples, $X_i$ is copper concentration in each sample, $W_{si}$ is a blending amount of Si (% by weight), and $W_{cu}$ is a blending amount of Cu (% by weight).

In case of measuring the degree of mixing, N (the number of samples) should be 20 or more for an exact measurement. The inventors have found that there is no significant difference when $N \geq 20$. Therefore, in the present invention, the degree of mixing is defined as the value obtained from the above Rose's equation in which $N \geq 20$, samples are taken by spot sampling method using a bar type or midget type sampler, and each sample is taken in an amount of 1 to 50 grams.

As described above, copper or a copper compound is added to metallic silicon powder and uniformly dispersed therein. For uniform mixing, any desired mixer may be used. Useful examples are stationary mixers such as V-type mixers and fixed mixers such as ribbon, screw and high-speed shearing mixers.

The mixing conditions including mixing rate and mixing time are selected by the type and size of a mixer and operation conditions (rotating rate, powder charge ratio in the mixer, etc.) For example, when a 20-liter Henschel mixer is used and operated in a powder charge ratio of 30 weight/volume % at a rotating ratio of 1000 rpm, the degree of mixing will become 0.9 or more at a mixing time of 30 minutes or more.

The metallic silicon powder having copper or copper compound uniformly dispersed therein can be advantageously used in a fixed bed reactor furnace such as a tunnel furnace. Once uniformly mixed, the raw material maintains uniform dispersion during the reaction process in the reactor furnace where direct nitriding reaction can take place effectively.

On the contrary, fluidized bed and rotary kiln type reactors have the likelihood that even though the raw material has been uniformly mixed, classification or separation can occur between the metallic silicon and the copper or copper compound due to a difference in density or particle size. In this regard, a mixture of the metallic silicon and the copper or copper compound in a predetermined mixing ratio and preferably having a degree of mixing of 0.9 or more is combined with a suitable binder such as polyvinyl alcohol, methyl cellulose, cellulose derivatives and starch and molded into a shape of suitable size, for example, of 100 μm to 30 mm, the shape being ready for use in direct nitridation. If desired, the shape is heat treated at a temperature of 1,000° to 1,400° C. in an inert gas atmosphere at atmospheric pressure or in an inert atmosphere under reduced pressure (preferably less than 100 Torrs) or in vacuum, to form a sintered shape which is subject to direct nitridation. Alternatively, a mixture of the metallic silicon and the copper or copper compound in a predetermined mixing ratio is melted to form a silicon-copper alloy which is finely divided into grits of a predetermined size, the grits being ready for use in direct nitridation. In this case, the degree of mixing is not necessarily 0.9 or more.

In the shaping embodiment using a binder, the binder is added to the mixture in an amount of 0.5 to 10%, preferably 1 to 3% by weight calculated as solids. This blend is granulated into granules having a mean particle size of 100 μm to 30 mm, preferably 300 μm to 5 mm using a granulating molding machine such as an extrusion granulator. The granules are then briefly sintered at 1,000° to 1,400° C., preferably 1,200° to 1,400° C. in an inert gas atmosphere such as argon and helium to such an extent such that silicon is lightly fused together. During the sintering step, the binder such as polyvinyl alcohol added for granulation is burnt off.

The shaping embodiment is not limited to granules. Instead, the binder-containing mixture may be molded into rod, block or spherical shapes using extrusion molding machines of screw and hydraulic types. These shapes may be pre-treated as mentioned above if desired, and are subjected to nitridation in a fixed bed furnace such as a tunnel furnace. In case of nitriding the molded shape, the obtained silicon nitride shape is pulverized to a suitable particle size.

According to the present invention, the uniform mixture of metallic silicon and copper or copper compound as such or in shaped or sintered form is subjected to direct nitridation in a conventional manner, that is, nitriding reaction in a non-oxidizing gas atmosphere containing nitrogen or ammonia at a temperature in the range of 1,000° to 1,500° C., thereby producing high α-type silicon nitride powder. The non-oxidizing gas may be nitrogen or ammonia alone or a mixture of nitrogen or ammonia with at least one of argon, helium and hydrogen.

In this way, silicon nitride powder is produced generally at an α-conversion of 90% or higher, especially 92% or higher.

Often, the resulting silicon nitride powder is treated with an acid such as hydrochloric acid, nitric acid and hydrofluoric acid at room temperature to 80° C. for 10 minutes to 3 hours and then washed with water and dried in a conventional manner. The acid treatment is effective for removing impurities such as iron, oxygen and unreacted metallic silicon as well as the copper catalyst from the silicon nitride powder, thus yielding silicon nitride powder of high purity. More specifically, the acid treatment is effective for reducing the copper value in the silicon nitride powder to less than 5 ppm. From silicon nitride powder of such high purity, there can be obtained a sintered silicon nitride product having a room temperature sintered strength of 900 MPa or higher.

By adding a controlled small amount of copper catalyst to the starting metallic silicon powder, the invention is successful in preparing silicon nitride powder having a high α-conversion in a simple and stable manner. Since the copper catalyst can be efficiently removed from the silicon nitride powder through conventional acid treatment, there is obtained at low cost and high efficiency a silicon nitride powder of high purity from which a product of high strength can be sintered. The method is fully expandable to an industrial scale of manufacture.

EXAMPLE

Examples of the invention are given blow by way of illustration and not by way of limitation.

Examples 1-2 & Comparative Examples 1-7

To metallic silicon powder having a mean particle size of 2 to 3 μm, copper having a mean particle size of 35 μm (specific surface area 0.4 m²/g) was added in an amount shown in Table 1 to the metallic silicon. The mixture was charged in a 20-liter Henschel mixer with a powder charge ratio of 30% and mixed at a rotating rate of 1000 rpm for a time shown in Table 1. 30 samples (each sample 3 g) were taken from the mixture by a spot sampling method using a midget spoon to evaluate the degree of mixing according to Rose's equation defined above. The results were shown in Table 1.

Then the mixture, 200 grams, was placed on a silicon nitride tray and subjected to nitriding reaction by heating at a center reaction temperature of 1,300° C. while passing a 4:1 mixture of nitrogen and hydrogen gases. The resulting silicon nitride was measured for α-conversion and reactivity by X-ray diffraction analysis. The results are also shown in Table 1.

The silicon nitride was pulverized to a mean particle size of 0.4 to 0.5 μm in a 5-liter wet mill. To the slurry was added 200 grams of hydrofluoric acid and 200 grams of nitric acid. Acid treatment was continued for one hour at 80° C. water washing and drying yielded a silicon nitride product, which was measured for residual copper by ICP emission spectroscopic analysis and for strength by a three-point bending test at room temperature. For comparison purposes, similar products were prepared from a copper-free silicon powder and silicon powders containing various amounts of copper. The results are shown in Table 1.

TABLE 1

|  | Cu content (wt %) | Mixing time (min.) | Degree of mixing $(1 - S/\sigma_0)$ | Reactivity (%) | α-conversion (%) | Residual Cu (ppm) | RT sintered strength (MPa) |
| --- | --- | --- | --- | --- | --- | --- | --- |
| Example 1 | 0.37 | 30 | 0.93 | 99.2 | 94.8 | less than 5 | 930 |
| Example 2 | 0.37 | 60 | 0.95 | 99.7 | 95.3 | less than 5 | 950 |
| Comparative Example 1 | 0.37 | 1 | 0.45 | 79.5 | 87.2 | 10 | 810 |
| Comparative Example 2 | 0.37 | 5 | 0.72 | 87.3 | 85.3 | less than 5 | 840 |
| Comparative Example 3 | 0.37 | 15 | 0.83 | 94.3 | 89.8 | less than 5 | 880 |
| Comparative Example 4 | 5.1 | 60 | 0.92 | 99.5 | 96.0 | 150 | 620 |
| Comparative Example 5 | 0.5 | 60 | 0.93 | 99.0 | 96.4 | 10 | 850 |
| Comparative Example 6 | 0.02 | 60 | 0.97 | 77.3 | 86.3 | less than 5 | 830 |
| Comparative Example 7 | 0 | — | — | 78.0 | 86.1 | — | 820 |

Example 3 & Comparative Examples 8-11

To a mixture of metallic silicon powder as in the above Examples and Comparative Examples and copper in a proportion shown in Table 2 and having a degree of mixing of more than 0.9 by mixing them for 60 minutes, a polyvinyl alcohol aqueous solution was added in an amount of 1% by weight calculated as solids. After full milling, the mixture was granulated to a mean particle size of 0.5 mm by means of a granulator. The granules were dried at 150° C. for one hour to remove water and then sintered by heating at 1,200° C. for one hour in an argon gas stream under a pressure of 100 mmHg. The sintered granules were fed at a rate of 100 grams/hour to a rotary kiln where nitriding reaction took place at 1,300° C. in a stream of a 4:1 mixture of nitrogen and hydrogen gases. Thereafter, the resulting silicon nitride was treated as in the above Examples and Comparative Examples. For comparison purposes, similar products were prepared from a copper-free silicon powder and silicon powders containing excess amounts of copper. The results are shown in Table 3.

It is noted that when the mixture was fed to a rotary kiln without granulation, the powder agglomerated midway in the kiln, inhibiting further continuation of nitriding reaction.

TABLE 2

| Cu content (wt %) | α-conversion (%) | Reactivity (%) | Residual Cu (ppm) | RT sintered strength (MPa) | |
| --- | --- | --- | --- | --- | --- |
| 5 | 95.5 | 99.9 | 145 | 650 | Comparative Example 9 |
| 0.5 | 96.4 | 99.0 | 13 | 860 | Comparative Example 10 |
| 0.35 | 96.0 | 98.9 | <5 | 940 | Example 4 |
| 0.03 | 88.3 | 86.3 | — | 840 | Comparative Example 11 |
| 0 | 89.1 | 86.0 | — | 850 | Comparative Example 12 |

Example 4

In a crucible, 1 kg of metallic silicon and grams of copper were melted and mixed at 1,600° C., then cooled and pulverized into grits having a mean particle size of 2 to 3 μm. The alloy grits, 200 grams, was placed on a silicon nitride tray and subjected to nitriding reaction by heating at a center temperature of 1,350° C. while passing a 4:1 mixture of nitrogen and hydrogen gases. Thereafter, the same procedure as in Example 3 was repeated. The resulting silicon nitride powder had an α-conversion of 94.3%, a reactivity of 98.5%, a residual copper content of less than 5 ppm, and a sintered product thereof had a three-point bend strength of 950 MPa.

Japanese Patent Application No. 5-166183 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for preparing a high alpha-type silicon nitride powder comprising the steps of:
   adding to metallic silicon powder at least one member selected from copper and copper compounds in an amount of from 0.05% to less than 0.5% by weight of copper based on the weight of the metallic silicon,
   mixing said member with metallic silicon so that the degree of mixing reaches 0.9 or more, and
   nitriding the mixture in a non-oxidizing gas atmosphere containing nitrogen or ammonia at a temperature in the range of 1,000° to 1,500° C. to obtain a silicon nitride powder having an d-conversion of 90% or higher.

2. A method for preparing a high alpha-type silicon nitride powder comprising the steps of:
   adding to and mixing with metallic silicon powder at least one member selected from copper and copper compounds in an amount of from 0.05% to less than 0.5% by weight of copper based on the weight of the metallic silicon,
   molding the mixture into a shape with the aid of a binder, and
   nitriding the shape in a non-oxidizing gas atmosphere containing nitrogen or ammonia at a temperature in the range of 1,000° to 1,500° C. to obtain a silicon nitride powder having an α-conversion of 90% or higher.

3. The method of claim 2 which further includes the step of sintering the shape in an inert atmosphere at atmospheric or reduced pressure or in vacuum, prior to the nitriding step.

4. A method for preparing a high alpha-type silicon nitride powder comprising the steps of:
   blending and melting with metallic silicon powder at least one member selected from copper and copper compounds in an amount of from 0.05% to less than 0.5% by weight of copper based on the weight of the metallic silicon to form a silicon-copper alloy,
   finely dividing the alloy into grits having a predetermined particle size, and
   nitriding the grits in a non-oxidizing gas atmosphere containing nitrogen or ammonia at a temperature in the range of 1,000° to 1,500° C. to obtain a silicon nitride powder having an α-conversion of 90% or higher.

5. The method of claim 1, wherein the copper or copper compound is provided in an amount of 0.1% to 0.4% by weight of copper based on the weight of the metallic silicon.

6. The method of claim 2, wherein the copper or copper compound is provided in an amount of 0.1% to 0.4% by weight of copper based on the weight of the metallic silicon.

7. The method of claim 4, wherein the copper or copper compound is provided in an amount of 0.1% to 0.4% by weight of copper based on the weight of the metallic silicon.

8. The method of claim 1, wherein the copper or copper compound is mixed in the metallic silicon so that the degree of mixing is 0.93 or more.

9. The method of claim 1, wherein the metallic silicon powder has a particle sized of several microns to about 149 microns.

10. The method of claim 2, wherein the metallic silicon powder has a particle sized of several microns to about 149 microns.

11. The method of claim 4, wherein the metallic silicon powder has a particle sized of several microns to about 149 microns.

12. The method of claim 1, wherein metallic copper is added to the metallic silicon powder.

13. The method of claim 2, wherein metallic copper is added to the metallic silicon powder.

14. The method of claim 4, wherein metallic copper is blended with the metallic silicon powder.

15. The method of claim 2, wherein the binder is added to the mixture in an amount of 0.5 to 10% by weight calculated as solids, the molded shapes are granulated into granules with a mean particle size of 100 μm to 30 mm.

16. The method of claim 3, wherein the shapes are sintered at a temperature of 1,000° to 1,400° C.

17. The method of claim 1, further comprising treating the silicon nitride powder with acid to obtain a silicon nitride powder having a copper content of less than 5 ppm.

18. The method of claim 2, further comprising treating the silicon nitride powder with acid to obtain a silicon nitride powder having a copper content of less than 5 ppm.

19. The method of claim 4, further comprising treating the silicon nitride powder with acid to obtain a silicon nitride powder having a copper content of less than 5 ppm.

* * * * *